United States Patent [19]

Mamiya

[11] Patent Number: 4,876,558

[45] Date of Patent: Oct. 24, 1989

[54] PUMP DEVICE AND AN INK JET RECORDING APPARATUS HAVING THE PUMP DEVICE

[75] Inventor: Toshiharu Mamiya, Kawasaki, Japan

[73] Assignee: Canon Kabushiki Kaisha, Tokyo, Japan

[21] Appl. No.: 224,246

[22] Filed: Jul. 25, 1988

Related U.S. Application Data

[63] Continuation of Ser. No. 894,105, Aug. 7, 1986, abandoned.

[30] Foreign Application Priority Data

Aug. 9, 1985 [JP] Japan .............................. 60-175464

[51] Int. Cl.[4] ......................... G01D 15/16; B41J 3/04; F04B 7/00

[52] U.S. Cl. ................................. 346/140 R; 417/444

[58] Field of Search ......................... 346/140; 417/444

[56] References Cited

U.S. PATENT DOCUMENTS

| | | | |
|---|---|---|---|
| 600,626 | 3/1898 | Stumpf | 417/520 X |
| 4,394,669 | 7/1983 | Ozawa | 346/140 |
| 4,410,900 | 10/1983 | Terasawa | 346/140 |
| 4,569,641 | 2/1986 | Falk | 417/444 X |
| 4,577,203 | 3/1986 | Kawamura | 346/140 |

*Primary Examiner*—Joseph W. Hartary
*Attorney, Agent, or Firm*—Fitzpatrick, Cella, Harper & Scinto

[57] ABSTRACT

In a pump device wherein a piston is reciprocally moved in a predetermined range within a cylinder to thereby produce pressure, a liquid inflow hole is provided outside the predetermined range of the cylinder and a hermetically sealing member biased so as to hermetically seal the liquid inflow hole until the piston is moved by a predetermined amount is provided.

22 Claims, 5 Drawing Sheets

PUMP DEVICE AND AN INK JET RECORDING APPARATUS HAVING THE PUMP DEVICE

This application is a continuation of application Ser. No. 894,105, filed Aug. 7, 1986, now abandoned.

BACKGROUND OF THE INVENTION

1. Field of the Invention

This invention relates to a pump device and an ink jet recording apparatus having the pump device, and more particularly to a pump device suitable for use as recovery means used for the recovery of the normal operation of an apparatus dealing with liquid, such as an ink jet recording apparatus, and to an ink jet recording apparatus having such pump device.

2. Related Background Art

For example, an ink jet recording apparatus has heretofore suffered from clogging of the nozzle thereof by dust or solidification of liquidous ink or unsatisfactory discharge of ink caused by bubbles entering into the nozzle.

As the means for preventing the unsatisfactory discharge as described above, there are generally known a method of pressurizing ink by a pump and forcing dust or the like out of the fore end of the nozzle and a method of reducing the pressure of the ink and sucking out dust or the like from the fore end of the nozzle.

Of these methods, pressurizing the ink is more advantageous in obtaining great pressure and removing dust or the like than reducing the pressure of the ink. But in the case of the unsatisfactory discharge caused by residual bubbles or the like, the bubbles may be dissolved into the ink by the pressurization and the bubbles may be again produced when the original pressure of the ink is restored. Thus the problem of unsatisfactory discharge cannot sometimes be substantially solved and therefore, it would be advantageous to use a method of reducing the pressure in a cap covering the fore end portion of the nozzle by a pump device and sucking ink from the fore end of the nozzle.

An example of the conventional pump device in such a case will hereinafter be described with reference to a schematic cross-sectional view shown in FIG. 1A of the accompanying drawings.

In FIG. 1A, reference numeral 1 designates a cylinder. By a piston 2 being moved down, negative pressure is produced in the space formed by the upper surface of the piston 2 and the cylinder 1. The air-tightness between the cylinder 1 and the piston 2 is kept by two O-rings 3 and 4. A valve denoted by 5 is lightly biased by a plate spring 6 so as to hermetically seal a hole 2-*a* provided in the piston. A cylinder stand 7 is hermetically sealed by an O-ring 8 so that the ink in the cylinder 1 may not flow outwardly. A compression spring 9 biases the piston 2 so as to return it to the upper point which is its initial position. Designated by 1-*a* is an ink inflow hole provided in the cylinder 1. A tube 112 for directing the ink sucked from the fore end of the nozzle of an ink jet head and a tube 105 for directing the sucked ink so as to keep the amount of ink in the head constant are connected to the ink inflow hole 1-*a*. Since it is inconvenient for moisture to evaporate through the walls of these tubes, the tubes cannot be formed of a soft material such as silicon rubber and therefore, the connected portions of these tubes must be hermetically sealed by bonding. Reference numeral 108 denotes a discharge tube for directing the air pressurized by the lower surface of the piston 2 and the cylinder 1 and the sucked ink to the outside of the cylinder. (This tube will pose a problem even if it is formed of silicon rubber and therefore, it is connected by forcing the outer sleeve of the discharge hole into the tube.)

Operation of the pump device will now be described.

When the piston 2 is depressed, the volume between the cylinder 1 and the piston 2 increases and therefore negative pressure is produced. At this time, the valve 5 is biassed into intimate contact with the hole 2-*a* of the piston by the plate spring 6 and the produced negative pressure and keeps air-tightness. When the piston is further depressed and the O-ring 4 passes through the inflow hole -*a* of the cylinder 1, ink and or air is sucked from the head by the negative pressure produced in the cylinder. Thereafter, the piston is further depressed and held at the lower point of the range of movement of the piston 2. Suction of ink and/or air is continuously effected in accordance with the negative pressure in the space formed at this time. When the suction of ink is terminated, the force which has depressed the piston 2 is eliminated and the piston is returned to the upper point by the spring 9. At this time, the sucked ink collects between the cylinder 1 and the upper surface of the piston 2 and little of the negative pressure remains. Therefore, when the piston 2 is moved up, positive pressure is produced between the cylinder 1 and the upper surface of the piston 2. The ink and air present between the cylinder 1 and the upper surface of the piston 2 flow out through the hole 2-*a* until the positive pressure overcomes the force of the plate spring 6 to open the valve 5 and the piston 2 returns to the upper point. The ink having thus flowed out collects in the space formed in the cylinder stand 7 and, when the piston 2 is then depressed, the ink is forcibly discharged out of the cylinder through the discharge hole 7-*a*.

However, in the pump of such a structure, when the O-ring 4 passes through the inflow hole 1-*a*, it snaps at a corner of the inflow hole 1-*a* as shown in the schematic illustration of FIG. 1B of the accompanying drawings and the O-ring is liable to be damaged. This is very undesirable when the durability or reliability of the O-ring is taken into consideration.

It is often the case that the latest ink jet recording apparatuses each have nozzles corresponding to four colors, i.e., yellow, magenta, cyan and black for color printing, and in such case, the number of tubes connected to the pump is great, e.g. eight, and the O-ring is more liable to be damaged. FIG. 1C of the accompanying drawings is a schematic cross-sectional view of the cylinder 1 at the level of the inflow hole 1-*a*. When molding a cylinder of such a structure, a mold for drawing out the cylinder horizontally is required in addition to a mold for drawing out the cylinder axially thereof and thus, the mold structure becomes complicated. Further, assuming that the number of nozzles is increased to increase the number of tubes connected to the pump to twice, i.e., sixteen, it is difficult to increase the number of inflow holes horizontally as viewed in FIG. 1*c*. If an inflow hole is provided at another level of the cylinder 1, the times during which ink is sucked from the respective inflow holes will differ from each other and therefore the amount of sucked ink will differ from inflow hole to inflow hole. This is inconvenient. If an attempt is made to increase the number of inflow holes at the same level, it will be accompanied by the necessity of adding inflow holes in the vertical direction as viewed in FIG. 1C, and this will lead to the necessity of using a mold for molding in this direction as well, which in turn will lead to complication of the mold structure.

SUMMARY OF THE INVENTION

It is an object of the present invention to provide a pump device in which O-rings are not damaged by movement of a piston and for which a mold structure for molding the pump device has a simple cylinder shape, and an ink jet recording apparatus having such pump device.

It is another object of the present invention to provide a pump device in which a liquid inflow hole is provided outside the range in which a piston is moved and an inflow valve hermetically sealing the inflow hole is opened after the piston is moved by a predetermined amount to produce predetermined negative pressure, whereby O-rings mounted on the piston can be prevented from being damaged during reciprocal movement of the piston and the construction of a metal mold for molding a cylinder, and an ink jet recording apparatus having such pump device are simplified.

It is still another object of the present invention to provide a pump device in which a piston is reciprocally moved in a predetermined range within a cylinder to thereby produce pressure, characterized in that a liquid inflow hole is provided outside the range of the cylinder and a hermetically sealing member biased so as to hermetically seal the liquid inflow hole until the piston is moved by a predetermined amount is provided.

It is still another object of the present invention to provide an ink jet recording apparatus having an ink jet head for discharging liquid from an opening and effecting recording, a cap for covering said opening, and a pump device for producing negative pressure for sucking the air and/or the liquid in the cap, the pump device producing the negative pressure by a piston being reciprocally moved in a predetermined range within a cylinder. The pump device has a liquid inflow hole provided outside the range of the cylinder, and a hermetically sealing member biased so as to hermetically seal the liquid inflow hole until the piston is moved by a predetermined amount.

DESCRIPTION OF THE PREFERRED EMBODIMENT

The invention will hereinafter be described with reference to the drawings.

Figure 1A:
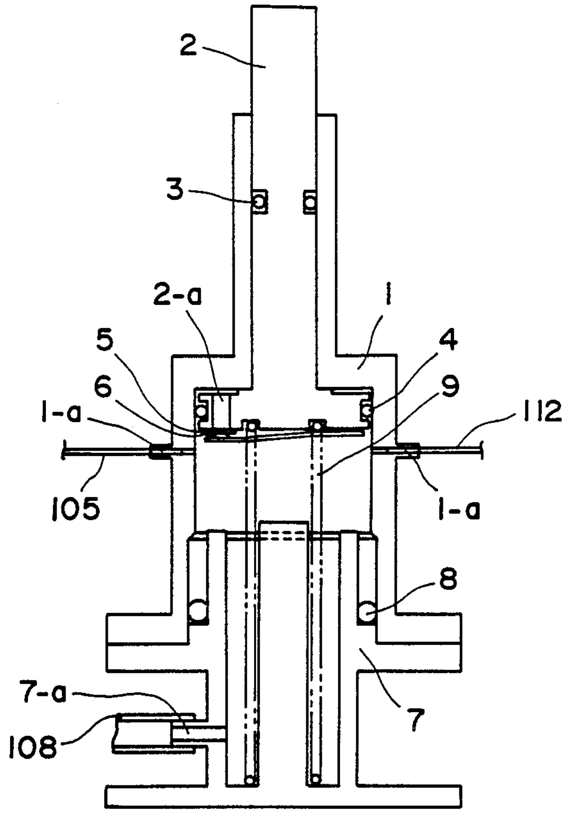
FIG. 1A PRIOR ART
FIG. 1A is a schematic cross-sectional view of a pump device according to the prior art.
Figure 1B:
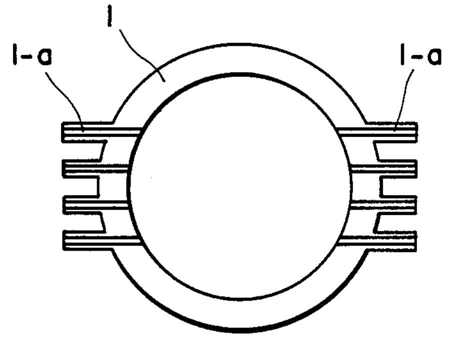
FIG. 1B PRIOR ART
FIGS. 1B and 1C are a schematic illustration and a schematic cross-sectional view, respectively, for illustrating the device according to the prior art.
Figure 1C:
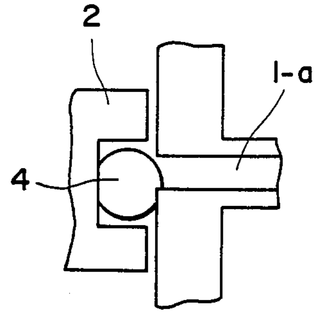
FIG. 1C PRIOR ART
Figure 2:
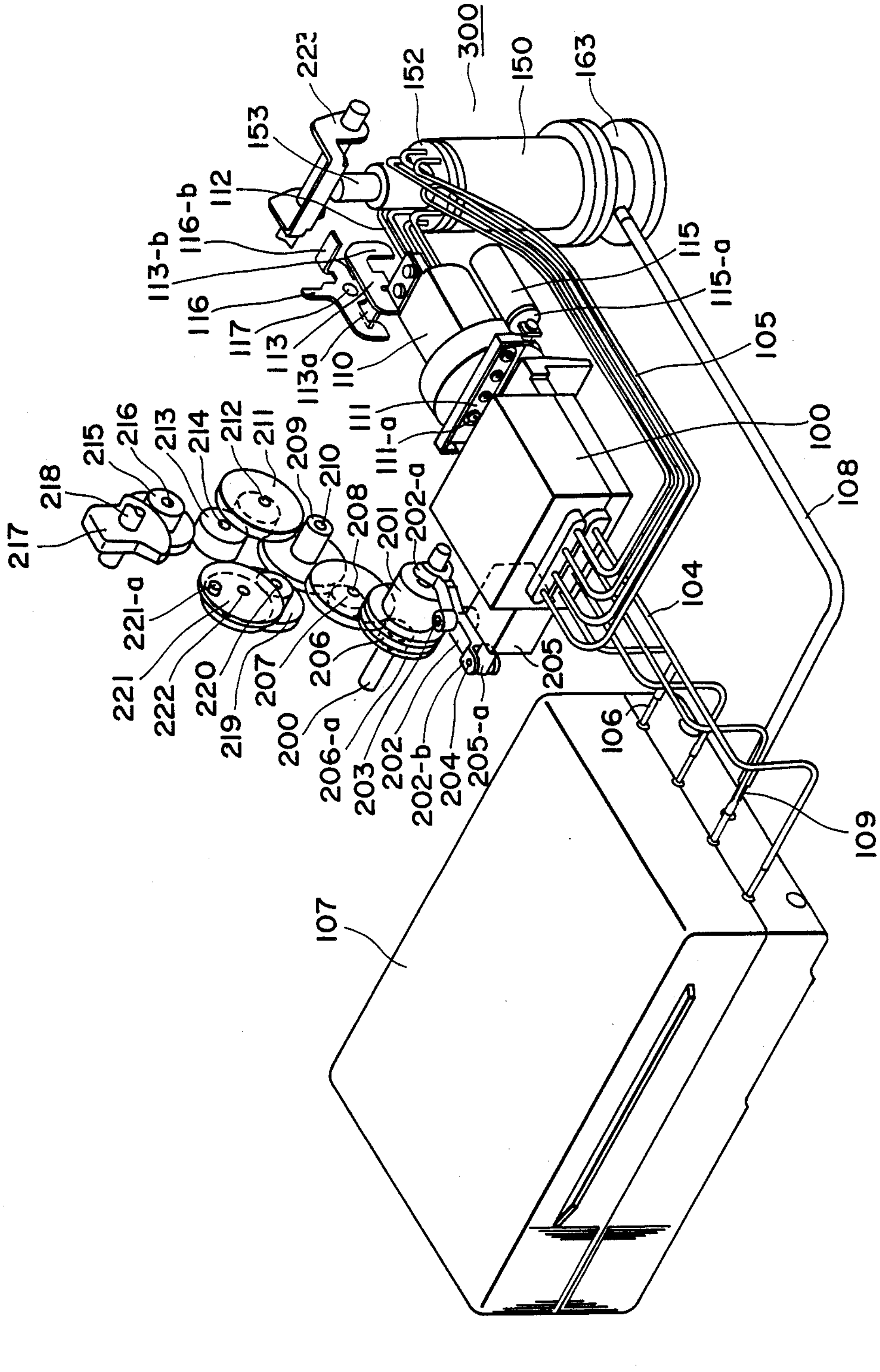
FIG. 2 is a schematic perspective view for illustrating the invention.

FIG. 2 is a schematic perspective view for illustrating the recovery means of an ink jet recording apparatus using the pump device of the present invention. FIG. 2 depicts the positional relations between various portions being shifted for convenience of illustration.

In FIG. 2, reference numeral 100 designates an ink jet head having four nozzles corresponding to liquids of four colors (the ends of these nozzles are provided with minute openings for discharging the liquids). Supply tubes 104 for supplying the liquids into the ink jet head 100 and adjusting tubes 105 for adjusting the amounts of liquids contained in the head 100 are connected to the ink jet head 100. The supply tubes 104 transport into the head 100 the liquids from four tanks storing therein the liquids of four colors contained in an ink cartridge 107, through hollow needles 106. The adjusting tubes 105 are connected to a pump device 300. Suction tubes 112 are also connected to the pump device 300. A discharge tube 108 for discharging the liquids sucked by the adjusting tubes 105 and the suction tube 112 is connected to the pump device, and the liquids discharged by the discharge tube 108 are directed to an ink absorbing member, not shown, contained in the ink cartridge 107, through a hollow needle 109. The hollow needles 106 and the hollow needle 109 are detachably connected to the ink cartridge 107 to facilitate the replacement of the cartridge 107 which will occur when the liquids stored in said tanks become exhausted.

The suction tubes 112 are connected to suction holes **111-*a* formed in a cap support member 111 and to the pump device 300. The cap support member 111 is formed of an elastic material such as rubber, and the suction holes 111-*a* are provided at locations corresponding to the nozzles (not shown) of the head 100. Each suction hole 111-*a* has, for example, a ring-like projection around it, and by the cap support member 111 being urged against the head 100**, the projections are closely coupled to the vicinity of the ends (openings) of the respective nozzles.

The cap support member 111 supports a cap 110 and is provided so as to be movable toward the head 100, and is biased toward the head 100 by a spring, not shown. A cap lever 113 coupled to the cap support member 111 cooperates with a holding lever 116 to hold the cap support member 111 at a position separate from the head 100 against the force of the spring which biases the cap support member 111 toward the head 100. In this held state, the holding lever 116 pivotally supported by a shaft 117 and biased counter-clockwise by a spring, not shown, has its restraining portion **116-*a* engaged with the bent portion 113-*a* of the cap lever 113. An air damper 115 having its movable portion 115-*a* engaged with the cap support member 111 is provided to alleviate the shock when the head 100** is capped and to prevent the damage of the nozzles and the scattering of the liquids.

Reference numeral 200 designates a clutch shaft to which the power of a motor, not shown, is transmitted. Reference numeral 201 denotes a clutch plate slidably and unrotatably supported on the clutch shaft 200. The clutch plate 201 is biased away from a clutch gear 206 by a spring, not shown. Reference numeral 202 designates a clutch actuating lever rotatably supported about a shaft 203. Reference numeral 205 denotes a solenoid. The movable iron core 205-*a* of the solenoid 205 is connected to one end 202-*b* of the clutch actuating lever 202 by a connecting shaft 204. The clutch gear 206 is supported for rotation about the clutch shaft 200 and not for sliding movement on the clutch shaft 200. Reference numerals 207, 209 and 211 denote gears for reducing and transmitting the output of the clutch gear 206. The gears 207, 209 and 211 are rotatably supported about shafts 208, 210 and 212, respectively. Reference numeral 213 designates a planetary gear rotatably supported about a shaft 214 fixed to a member (not shown) which is rotatably supported about the shaft 212. A moderate degree of friction is provided between the shaft 214 and the planetary gear 213, so that when the gear 211 rotates clockwise, the planetary gear 213 also moves clockwise, and when the gear 211 rotates counterclockwise, the planetary gear 213 also moves counterclockwise. Reference numeral 215 denotes a gear adapted to mesh with the planetary gear 213 when the latter moves clockwise. The gear 215 is rotatably supported about a shaft 216. Reference numeral 217 designates a sector-shaped piston driving gear which is in mesh engagement with the gear 215 and rotatably supported about a shaft 218. Reference numeral 219 denotes a gear adapted to mesh with the planetary gear 213 when the latter moves counter-clockwise. The gear 219 is rotatably supported about a shaft 220. Reference numeral 221 designates a cap gear which is in mesh engagement with the gear 19 and rotatably supported about a shaft 222. Reference numeral 223 denotes a piston driving lever fixed to the piston driving gear 217 and rotatably supported about the shaft 218.

Figure 5A:
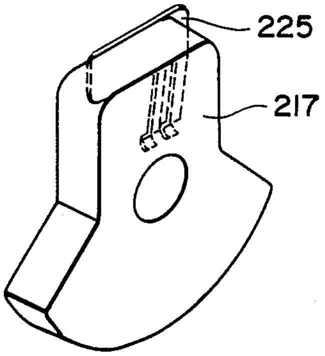
FIG. 5A is a schematic perspective view of a driving gear.
Figure 5B:
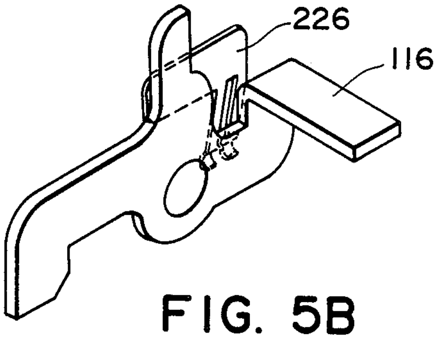
FIG. 5B is a schematic perspective view of a holding lever.

The holding lever 116 and the driving gear 217 are provided with contacts for effecting a series of recovering operations. In FIGS. 5A and 5B, there are shown schematic perspective views of the driving gear 217 and the holding lever 116 provided with contact pieces 225 and 226, respectively.

The contact piece 226 provided on the holding lever 116 is for detecting the rotated position of the holding lever 116 and slides on a base plate, not shown. The contact piece 225 provided on the driving gear 217 is for detecting the rotated position of the driving gear 217 and slides on a base plate, not shown.

Figure 6A:
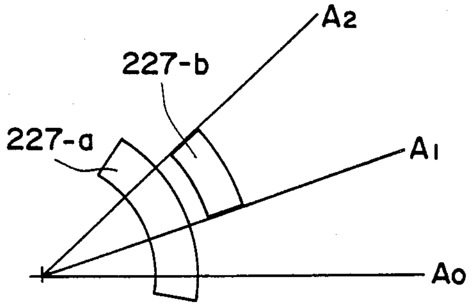
FIGS. 6A and 6B are schematic illustrations for illustrating an embodiment of the present invention.
Figure 6B:
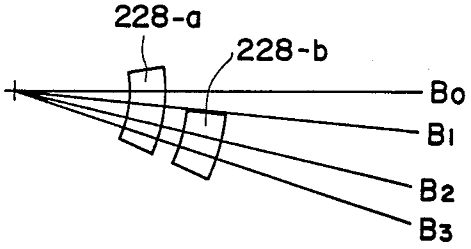
Figure 7:
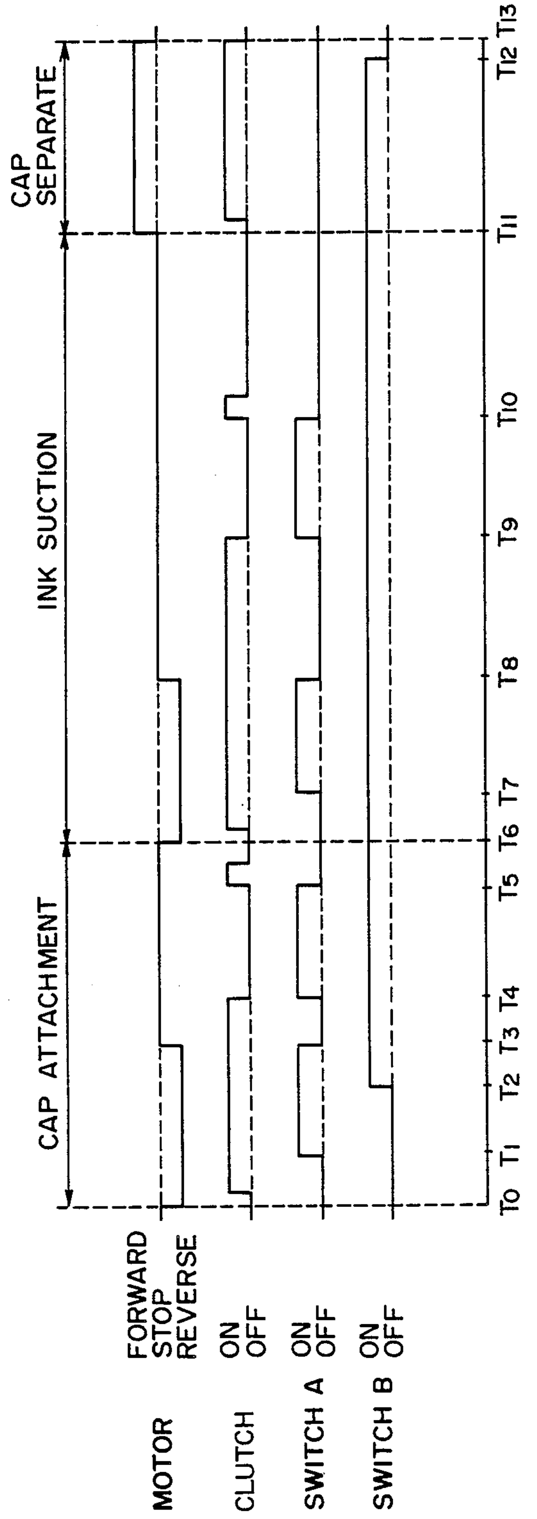
FIG. 7 is a time chart when the recovery means of the embodiment of the present invention is operated.

FIGS. 6A and 6B are schematic illustrations showing the angular relations between the patterns on the base plates on which the above-mentioned contact pieces 225 and 226 slide. The contact pieces 225 and 226 assume their ON position when the two legs thereof conduct between patterns 227-*a* and 227-*b* and between patterns 228-*a* and 228-*b*. FIG. 7 is a time chart showing the states of a motor, a clutch and switches in a series of operations associated with the pump. Forward revolution of the motor is the revolution of the motor in such a direction that the gear 211 rotates counter-clockwise, and reverse revolution of the motor is the reverse thereof. ON state of the clutch occurs when the solenoid 205 is electrically energized and the moveable iron core 205-*a* thereof is attracted, whereby the clutch actuating lever 202 is pivoted counter-clockwise to bring the clutch plate 201 into engagement with the engaging portion 206-*a* of the clutch gear 206 against the force of a spring, not shown. Switch A is a switch comprising the contact piece 225 and the patterns 227-*a*, 227-*b*, and switch B is a switch comprising the contact piece 226 and the patterns 228-*a*, 228-*b*.

Figure 3:
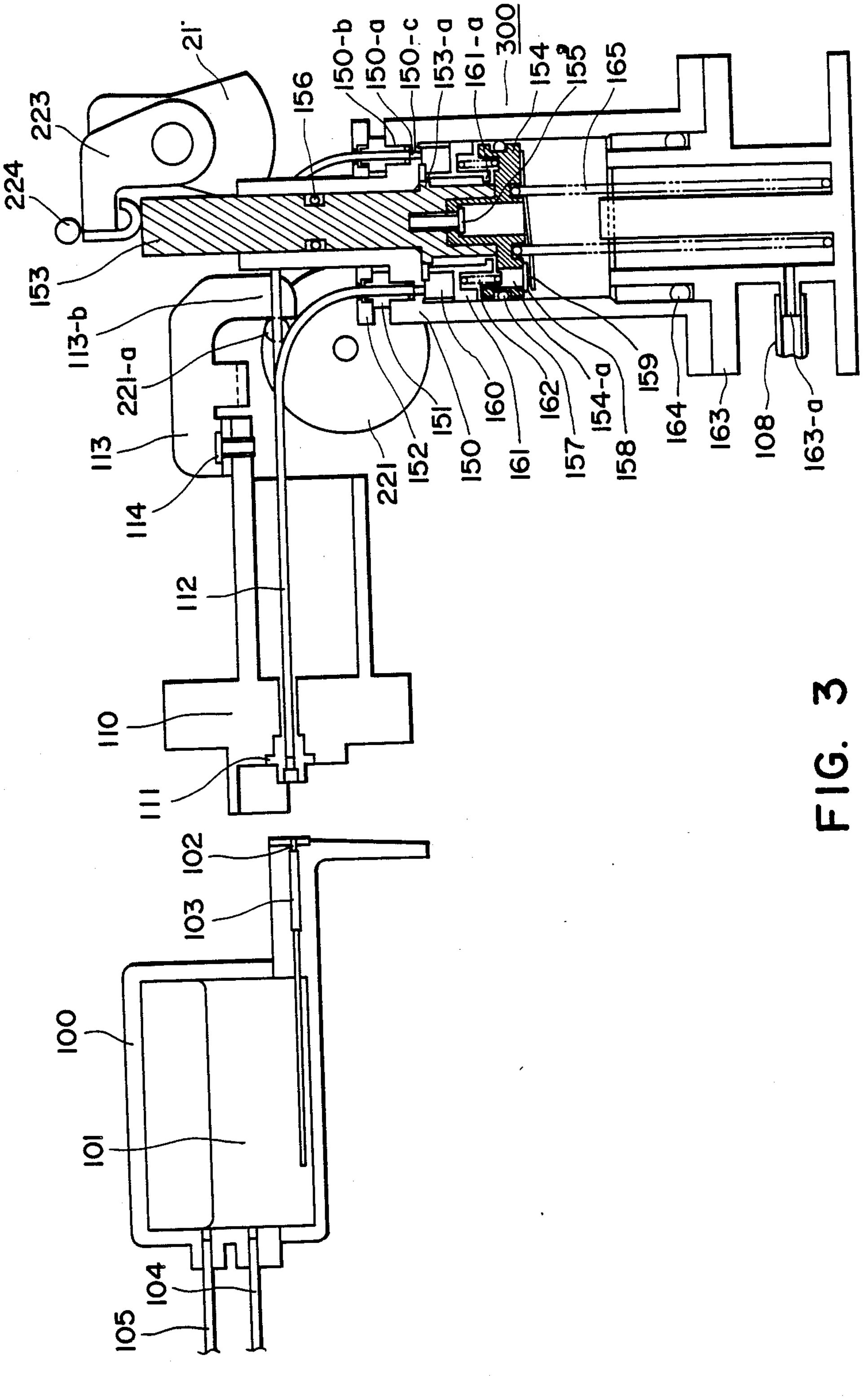
FIG. 3 is a schematic cross-sectional view for illustrating the device of the present invention.

The pump device of the present invention will now be described with reference to a schematic cross-sectional view shown in FIG. 3. In FIG. 3, members identical to those shown in FIG. 2 are given identical reference numerals and therefore need not be described in detail.

In FIG. 3, reference numeral 102 designates a nozzle and reference numeral 103 denotes a piezo-electric element. The piezo-electric element 103 is provided with wiring, not shown, and liquid 101 is discharged from an orifice provided at the fore end of the nozzle 102, in response to a signal input from a driving circuit, not shown.

Figure 4A:
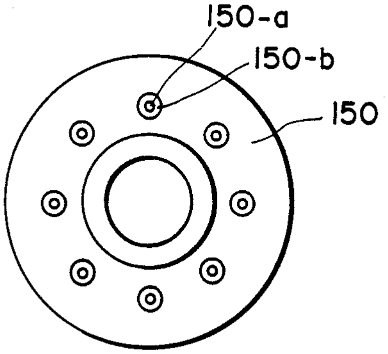
FIG. 4A is a schematic plan view of a tube receiver.
Figure 4B:
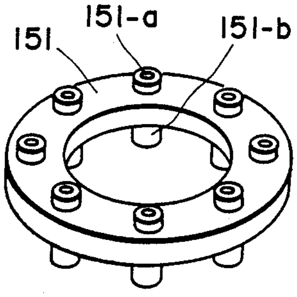
FIG. 4B is a schematic perspective view of the tube receiver.

Reference numeral 150 denotes the cylinder of the pump device 300. In the upper surface of the cylinder 150, there are formed liquid inflow holes (ink inflow holes) 150-*a* in parallel to the direction of movement of a piston 154. That is, the inflow holes 150-*a* are provided outside the range of movement of the piston 154. Designated by 151 is a tube receiver formed of an elastic material such as rubber. A schematic plan view and a schematic perspective view of this tube receiver are shown in FIGS. 4A and 4B, respectively. Denoted by 151-*b* are mounting portions for the cylinder. The mounting portions 151-*b* are forced into holes 150-*b* formed coaxially with the inflow holes 150-*a* of the cylinder 150. Designated by 151-*a* are holes for mounting the tubes. The inside diameter of the holes 151-*a* is equal to or slightly smaller than the outside diameter of the tubes, and the tubes 105 and 112 are forced into the holes 151-*a*. Thus, the tubes 105, 112 and the cylinder 150 can be kept air-tight without using any adhesive agent, and the mounting and dismounting of the tubes is possible. Reference numeral 152 designates keep members removably fixed by screw or like means so that the tube receiver does not come off. Reference numeral 153 denotes a piston shaft. Reference numeral 154 designates a piston fixed to the piston shaft 153 by a screw 155. Denoted by 156 and 157 are O-rings attached to the piston shaft 153 and the piston 154, respectively. They maintain an air-tight seal with respect to the cylinder 150. Reference numeral 158 designates an outflow valve biased by a plate spring 159 so as to hermetically seal an outflow hole 154-*a* formed in the piston 154. Reference numeral 160 denotes an inflow valve which is a hermetically sealing member for closing the inflow holes 150-*a* of the cylinder 150. The inflow valve 160 is formed of an elastic material such as rubber and mounted on a valve support member 161. Designated by 162 is a spring which is extended between the piston 154 and the valve support member 161 and urges the inflow valve 160 against the inflow holes 150-*a*. A seat 150-*c* is provided around each inflow hole 150-*a* to ensure the hermetic sealing of the inflow holes 150-*a* by the inflow valve 160. Reference numeral 165 denotes a spring having a force for returning the piston 154 to its upper point against the friction of the O-rings 156, 157 and the force of the spring 162. Reference numeral 163 designates a cylinder stand. The portion of the cylinder stand 163 which is connected to the cylinder 150 is hermetically sealed by an O-ring 164. Denoted by 163-*a* is a discharge hole for the ink sucked from the head. The aforementioned discharge tube 108 is connected to the discharge hole 163-*a*.

A control member 224 controls the range of movement of a piston driving lever 223 and prevents a piston driving gear 217 and a gear 25 from becoming disengaged from each other.

The operation up to the cap mounting, the ink suction and the cap separation will hereinafter be described more specifically.

The initial state is the state shown in FIGS. 2 and 3. First, a motor, not shown, is electrically energized to the reverse revolution side ($T_0$ in FIG. 7). Next, the solenoid 205 is electrically energized and the clutch is connected. This time difference between energizing the solenoid and the motor is done for the purpose of avoiding the rush current when the motor is started, and may sufficiently be of the order of 10–30 milliseconds. By the clutch being connected, the output of the motor is transmitted to the clutch gear 206 and so forth, whereby the gear 211 is rotated clockwise to move the planetary gear 213 clockwise until it comes into mesh engagement with the gear 215. By the planetary gear 213 coming into mesh engagement with the gear 215, the output of the motor is transmitted to the piston driving gear 217, whereby the piston driving gear 217 and the piston driving lever 223 are rotated counterclockwise. By the piston driving gear 217 being rotated counter-clockwise, the two legs of the contact piece 225 attached to the piston driving gear 217 are rotated from $A_0$ to $A_1$ of FIG. 6A, whereupon the switch A is closed ($T_1$ in FIG. 7). At this time, the piston driving lever 223 is rotated counter-clockwise, whereby the piston shaft 153 and the piston 154 are depressed against the force of the spring 165, but as regards the liquid inflow holes 150-*a* of the cylinder 150, the inflow valve 160 hermetically seals them by the force of the spring 162, and as regards the outflow hole 154-*a* of the piston 154, the outflow valve 158 hermetically seals it by the force of the plate spring 159. Further, the spaces between the cylinder 150 and the piston shaft 153 and between the cylinder 150 and the piston 154 are kept air-tight by the O-rings 156 and 157 and therefore, negative pressure is produced within the cylinder 150. When the piston driving lever 223 is rotated counter-clockwise, the bent portion 116-*b* of the cap holding lever 116 which is within the range of operation of the piston driving lever 223 strikes against the piston driving lever 223, whereby the cap holding lever 116 is rotated clockwise against the force of a spring, not shown. When the engagement between the restraining portion 116-*a* of the cap holding lever 116 and the bent portion 113-*a* of the cap lever 113 is released, the cap support member 111 moves toward the nozzle 102 of the head 100 with the aid of the force of a spring, not shown, and the ring-like projection of the cap 110 strikes against the circumference of the nozzle 102 of the head 100 and is stopped thereby. At this time, the speed of movement of the cap support member 111 is attenuated by the air damper 115 and therefore, the nozzle 102 will not be damaged or the ink adhering to the circumference of the nozzle 102 will not scatter when the projection of the cap 110 strikes against the circumference of the nozzle 102. As soon as or slightly later than the piston driving lever 223 releases the engagement between the cap holding lever 116 and the cap lever 113, the projection 153-*a* of the piston shaft 153 comes into engagement with the projection 161-*a* of the valve support member 161, whereby the valve support member 116 is depressed and the inflow valve 160 separates from the seat 150-*c* of the cylinder 150 and thus, the inflow holes 150-*a* are opened. At this time, the cap 110 is moving toward the nozzle 102 and thus, air is sucked through the cap 110 and the tube 112, and even when the cap 110 strikes against the nozzle 102, air is not forced into the fore end of the nozzle to retract the surface of the ink and the ink cannot be discharged. When the pump driving gear 217 further rotates counter-clockwise and the contact piece 225 rotates to $A_2$ of FIG. 6A, the switch A is opened (T3 in FIG. 7). This is the lower point of the piston 154 and therefore, the motor is stopped (locked' by the shorting between the terminals). At this point in time, the cap 110 is mounted on the head 100 and therefore, even if air is forced into the fore end of the nozzle 102, the piston 154 is held at the lower point for a time (e.g. for 1 to 2 seconds), whereby a small amount of ink is sucked from the nozzle 102 by the negative pressure remaining in the cylinder 150 and thereby the surface of the ink in the nozzle 102 can be drawn back. When the holding of the piston 154 at the lower point is terminated ($T_4$ in FIG. 7), solenoid 205 is electrically deenergized and the clutch plate 201 is separated from the clutch gear 206 by the force of a spring, not shown, and the clutch becomes disengaged. Thereupon, the piston 154 and the piston shaft 153 try to return to the upper point which is their initial position with the aid of the force of the spring 165. At this time, the piston shaft 153 rotates the piston driving lever 223 and the piston driving gear 217 clockwise and the planetary gear 213 is held in its engaged state and thus, the gears from the piston driving gear 217 to the clutch gear 206 are rotated. Also, this gear system is an increased side gear train when viewed from the piston driving gear 217 and therefore provides a considerable load. Further, when the friction of the O-rings 156 and 157 and the force of the spring 162 between the valve support member 161 and the piston 154 ,are taken into account the force of the spring 165 need to be considerably large.

In a measurement of the forces generated by the present embodiment, the force of the friction of the two O-rings was about 1000 g and the maximum force of the spring 162 was about 400 g. Therefore, if the force of the spring 165 at the point is set to about 2000 g, the force thereof at the lower point is about 3500 g and the force necessary to push the piston to the lower point is about 4500 g. Thus, the force of the spring 165 is considerably large and therefore, the energy imparted to each gear in the process wherein the, piston returns to the upper point is also considerably large. Even if the piston returns to the upper point, each gear continues to rotate, but the piston driving gear 217 is stopped because the piston driving lever 223 strikes against the stopper 224, and therefore the gear 215 is also stopped. However, the other gears continue to rotate by inertia energy as if the motor were revolving in the forward direction. As a result, the gear 211 rotates counter-clockwise and therefore, the planetary gear 213 moves counter-clockwise and comes into mesh engagement with the gear 219. Then the cap gear 221 rotates clockwise, the projection 221-*a* of the cap gear 221 comes into engagement with the leg 113-*b* of the cap lever 113 and pulls the cap 110 away from the head 100. However, the energy of each gear is sucked by the spring which biases the cap 110 toward the head 100, and the cap support member 111 only separates slightly from the head 100 and is again urged against the head by the force of the spring. However, the negative pressure produced in the aforedescribed process of cap mounting remains slightly in the head 100 and therefore, the surface of the ink in the nozzle retracts due to this negative pressure. There will be no problem if thereafter the ink suction is performed by a series of pump operations, but when only the cap mounting is effected to prevent desiccation of the nozzle 102 for the purpose of preservation or the like or to protect the nozzle 102 during transportation, if the ink suction is not performed before the apparatus is used next time, ink will not be discharged. Thus, the ink suction needs to be done before the apparatus is used. This results in the waste of ink and is not preferable. Therefore, it is necessary to stop the rotation of the gears a little before the piston 154 returns to the upper point and the piston driving lever 223 strikes against the stopper 224. When the piston driving gear 217 rotates clockwise with the aid of the spring 165 and the contact piece 225 rotates from $A_2$ to $A_1$ of FIG. 6A, the switch A changes over from its ON position to its OFF position ($T_5$ in FIG. 7). At this time, the inflow holes 150-*a* of the cylinder 150 are closed by the inflow valve 160, while the piston 154 only returns to a position a little lower than the upper point. When the solenoid 205 is then electrically energized to bring the clutch plate 201 into engagement with the clutch gear 206 for a small period of time, the gears from the clutch gear 206 to the piston driving gear 217 are stopped because the motor is in its locked state. Even if the solenoid 205 is again electrically deenergized and the clutch is disengaged, each gear is only slightly rotated by the spring 165 and immediately the piston driving lever 223 strikes against the stopper 224. The energy obtained by each gear in the meantime is small and each gear tries to rotate more or less after the piston driving gear 217 has been stopped. But such rotation is absorbed by the friction imparted to the planetary gear 213 or other friction and therefore, each gear hardly rotates and is stopped. The return of the piston 154 to the upper point which is its initial position occurs for a small period of time, and then the apparatus shifts to the ink suction operation. This operation is substantially the same as that during the cap mounting.

First, the motor is electrically energized to the reverse revolution side (T6 in FIG. 7). And short time later, the clutch is engaged. The piston driving gear 217 is rotated counter-clockwise and the contact piece 225 is also rotated from A0 to Al and further to A2 in FIG. 6A. The switch A is in its OFF position while the contact piece 225 is rotated from the initial position A0 to A1. Switch A is in its ON position while the contact piece 225 is rotated from A1 to A3, and is again in its OFF position when the contact piece 225 passes A2. The motor is stopped (locked) when the OFF position of the switch A is detected past A2. This is a countermeasure for counteracting unsatisfactory contact of the switch. As previously described, the spring 165 which biases the piston 154 upwardly is considerably strong, and the force necessary to push the piston 154 to the lower point, including the friction on the two O-rings 156 and 157, is about 4500 g, and the force which must be produced by the piston driving lever 223 while the motor is decelerated must preferable be 10,000 g or more. When unsatisfactory contact of the switch is caused with the detection of the lower point of the piston 154 being effected when the switch changes over from its OFF (opened) position to its ON (closed) position, the lower point cannot be detected and the motor continues to revolve. The piston 154 lowers until it strikes against the cylinder stand 163. Even when the piston is stopped, the motor tries to continue its revolution and therefore, a maximum force which can be produced by the motor is applied to the piston driving lever 223, whereby the piston driving lever 223 may be deformed or the teeth of the gear of the least strength of the gears which transmit the output of the motor may be damaged. Also, where both of the lever and the gears are sufficiently strong, the motor may be stopped while being electrically energized and the coil in the motor may burn or be burnt off. To prevent such an inconvenience from occurring in the present embodiment, the change-over of the switch A from its ON position to its OFF position is detected to thereby stop the motor (T8 in FIG. 7). In the meantime, as described with respect to the cap mounting, the piston 154 is depressed and negative pressure is produced in the cylinder 150, whereafter the inflow valve 160 which is a hermetically sealing member is opened. Since the cap 110 is already mounted on the head 100, ink is sucked from the nozzle 102 and fresh ink is supplied from the ink tank in the ink cartridge 107 through the tubes 104. Also, air and ink are sucked through the tubes 105 and thus, the amount of ink in the head 100 is kept constant. Since the fluid resistance with which ink is sucked through the tubes 105 is greater than the fluid resistance with which ink is sucked through the nozzle 102, most of the sucked ink is sucked through the nozzle 102. The amount of sucked ink is related with the time during which the piston 154 is held at the lower point and therefore, the time may be set in conformity with the amount of ink to be sucked by a pump operation. After a predetermined time (or a predetermined amount of suction), the clutch is disengaged (T9 in FIG. 7). As described with respect& to the cap mounting, the piston 154 is returned to the upper point by the spring 165 and in that process, each gear is rotated and therefore, by the rotation of each gear, the cap 110 is temporarily separated from the nozzle 102. In order to prevent the surface of the ink in the nozzle 102 from being retracted by the residual negative pressure in the head 100, the clutch is temporarily engaged near the upper point (T10 in FIG. 7). Thereafter, the piston 154 returns to the upper point which is the initial position, whereafter the apparatus waits until the negative pressure in the head is substantially eliminated. This negative pressure is eliminated by ink flowing from the ink tank into the head through the tubes 104 and depends on the speed at which the ink flows. The flow speed of ink depends on the viscosity of ink and thus is related with temperature. According to measurements taken of the present embodiment, the time was about 20 seconds for 25° C. and was about 40 seconds for 5° C. and therefore, irrespective of temperature, in 40 seconds, substantially no problem occurs. Of course, the temperature of ink may be detected and the waiting time may be made variable. After the negative pressure in the head 100 has been eliminated, the apparatus shifts to the cap separating operation.

In the present embodiment, the point in time at which the motor is stopped is detected by the switch B closed and opened by the movement of the cap holding lever 116 and therefore, the movements of the switch B and the cap holding lever 116 between the cap mounting and the ink suction will now be described. As described to some extent with respect to the cap mounting, as the piston driving lever 223 is rotated counter-clockwise, it strikes against the bent portion 116-*b* of the cap holding lever 116 and thereby rotates the cap holding lever 116 clockwise. During the time that the piston driving lever 223 depresses the piston 154 to the lower point, the contact piece 226 mounted on the cap holding lever 116 is rotated from $B_0$ to $B_3$ in FIG. 6B. At the position $B_1$ in the course, the switch B changes over from its OFF position to its ON position ($T_2$ in FIG. 7). The piston 154 is pushed back to the upper point by the spring 165 and the piston driving lever 223 is returned counter-clockwise, whereby the cap holding lever 116 follows the piston driving lever 223 with the aid of a spring, not shown, and rotates counter-clockwise. But since the cap support member 111 and the cap lever 113 are moved toward the head 100 and the bent portion 113-*a* of the cap lever 113 stays within the range of operation of the cap holding lever 116, the cap holding lever 116 is stopped when the vicinity of the fore end of the restraining portion 116-*a* of the cap holding lever 116 strikes against the bent portion 113-*a* of the cap lever 113. At this time, the contact piece 226 is rotated from $B_3$ to $B_2$ in FIG. 6B, while the switch B keeps its ON position. During the ink suction as well, the cap holding lever 116 is rotated by the piston driving lever 223, but it is only reciprocally moved between $B_2$ and $B_3$ of FIG. 6B and the ON position of the switch B is maintained. Turning back to the description of the cap separating operation, a motor, not shown, is electrically energized to the forward revolution side ($T_{11}$ in FIG. 7), and a small time later, the clutch is engaged. Thereupon, the output of the motor is transmitted to the clutch gear 206 and the subsequent gears, whereby the gear 211 is rotated counter-clockwise and the planetary gear 213 is moved counter-clockwise, whereafter the planetary gear comes into mesh engagement with the gear 219 to thereby transmit the output of the motor. The gear 219 rotates the cap gear 221 clockwise, and the projection 221-*a* of the cap gear 221 comes into engagement with the leg 113-*b* of the cap lever 113 to thereby separate the cap 110 from the head 100. When the cap 110 returns to its initial position, the vicinity of the fore end of the restraining portion 116-*a* of the cap holding lever 116 becomes disengaged from the bent portion 113-*a* of the cap lever 113 and the cap holding lever 116 is rotated counter-clockwise by a spring, not shown, and returns to its initial position. At this time, the contact piece 226 mounted on the cap holding lever 116 is rotated from $B_2$ to $B_0$ in FIG. 6B. In the meantime, at a point in time after $B_1$, the switch B changes over from its OFF position to its ON position ($T_{12}$ in FIG. 7). Thereafter, the apparatus waits for a time during which the cap holding lever can return to its initial position (a time during which the contact piece 226 can rotate from $B_1$ to $B_0$), and then the motor is stopped and the clutch is disengaged. Even if the cap 110 is in a position slightly more spaced apart from the head 100 than the initial position, the cap 110 is moved toward the head 100 by the spring which biases the cap 110 toward the head 100, and is stopped and held in a position wherein the bent portion 113-*a* of the cap lever 113 is engaged with the restraining portion 116-*a* of the cap holding lever 116. During the cap separation as well, the change-over of the switch B from its ON position to its OFF position is detected to thereby stop the motor, and this is for the same reason as that set forth with respect to the cap mounting and the ink suction.

Although the present invention has been described as a pump device used in the recovery means of an ink jet recording apparatus using a piezo-electric element, the present invention is of course generally usable in ink jet recording apparatuses using an electro-mechanical converting member or an electro-thermal converting member such as a heat-generating resistance member or discharging liquid from an opening provided at the fore end of the nozzle (or an orifice provided to discharge liquid) by the use of other system.

It should also be understood that various modifications are conceivable within the scope of the invention as defined in the appended claims.

As described above, liquid inflow holes are provided outside the range in which the piston is moved and the inflow valve hermetically sealing these inflow holes is opened after the piston is moved by a predetermined amount to produce predetermined negative pressure, whereby the O-rings mounted on the piston can be prevented from being damaged during the reciprocal movement of the piston and also, the structure of the metal mold for molding the cylinder becomes simple.

I claim:

1. A pump device for use in an ink jet recording apparatus comprising a cylinder, a piston mounted for reciprocally moving within a predetermined range of movement in said cylinder to generate pressure and a liquid inlet in said cylinder, wherein;

said liquid inlet is disposed outside of the predetermined range of movement of said piston and a negative pressure is generated in said cylinder between said piston and said liquid inlet during movement of said piston;

said piston includes a sealing member biased into sealing engagement with said liquid inlet when said piston is in a first portion of its predetermined range of movement; and said liquid inlet is sealed by said sealing member against negative pressure in said cylinder when said piston is in the first portion of its predetermined range of movement and said liquid inlet is open to negative pressure in said cylinder when said piston is in a second portion of its predetermined range of movement.

2. A pump device according to claim 1, wherein said liquid inlet is provided in a side of said cylinder opposed to said piston.

3. A pump device according to claim 1, wherein said sealing member is an elastic member.

4. An ink jet recording apparatus comprising an ink jet head for discharging liquid from an opening and effecting recording, a cap for covering said opening and a pump device for producing negative pressure for sucking air and/or liquid in said cap, said pump device including a cylinder, a piston mounted for reciprocally moving within a predetermined range of movement in said cylinder to generate pressure, and a liquid inlet in said cylinder connected to said cup, wherein:

said liquid inlet is disposed outside of the predetermined range of movement of said piston and a negative pressure is generated in said cylinder between said piston and said liquid inlet during movement of said piston for sucking air and/or liquid in said cap;

said piston includes a sling member biased into sealing engagement with said liquid inlet when said piston is in a first portion of its predetermined range of movement; and said liquid inlet is sealed by said sealing member against negative pressure in said cylinder when said piston is in the first portion of its predetermined range of movement and said liquid inlet is open to negative pressure in said cylinder when said piston is in a second portion of its predetermined range of movement.

5. An ink jet recording apparatus according to claim 4, wherein said liquid inlet is provided in a side of said cylinder opposed to said piston.

6. An ink jet recording apparatus according to claim 4, wherein said sealing member is an elastic member.

7. An ink jet recording apparatus according to claim 4, wherein said pump device and the interior of said cap are communicated with each other by a tube.

8. An ink jet recording apparatus according to claim 7, wherein said tube is forced into a tube receiver and said tube receiver is forced into a hole communicating with said liquid provided in said cylinder.

9. An ink jet recording apparatus according to claim 8, wherein said tube receiver is fixed by a keep member.

10. An ink jet recording apparatus according to claim 8, wherein said tube receiver has a mounting portion with respect to said cylinder and a mounting portion for said tube.

11. An ink jet recording apparatus according to claim 10, wherein said mounting portion for said tube is a hole.

12. An ink jet recording apparatus according to claim 11, wherein the inside diameter of said hole is equal to the outside diameter of said tube.

13. An ink jet recording apparatus according to claim 11, wherein the inside diameter of said hole is smaller, than the outside diameter of said tube.

14. An ink jet recording apparatus according to claim 4, wherein said piston is driven by a piston driving lever fixed to a piston driving gear and rotatably supported about a shaft.

15. An ink jet recording apparatus according to claim 14, wherein said piston driving gear is substantially sector-shaped.

16. An ink jet recording apparatus according to claim 14, wherein said piston driving gear is provided with a contact piece for detecting the rotated position of said piston driving gear.

17. An ink jet recording apparatus according to claim 4, having a holding lever used to move said cap.

18. An ink jet recording apparatus according to claim 17, wherein said holding lever is provided with a contact piece for detecting a rotated position of said holding lever.

19. An ink jet recording apparatus according to claim 4, wherein said ink jet head including electrothermal converting elements.

20. A pump device for use in an ink jet recording apparatus comprising a piston mounted in a hollow member for reciprocally moving within a predetermined range of movement to generate pressure in the hollow member and a liquid inlet in said hollow member, wherein:

said liquid inlet is disposed outside of the predetermined range of movement of said piston and a negative pressure is generated in the hollow member between said piston and said liquid inlet during movement of said piston;

said piston includes biasing means for biasing a sealing member into sealing engagement with said liquid inlet; and said liquid inlet is sealed by the sealed member against negative pressure in the hollow member during a first portion of the predetermined range of movement of said piston and said liquid inlet is open during a second portion of the predetermined range of movement of said piston.

21. An ink jet recording apparatus comprising an ink jet head for discharging liquid from an opening and effecting recording, a cap for covering said opening and a pump device for producing negative pressure for sucking air and/or liquid in said cap, said pump device including a piston mounted in a hollow member for reciprocally moving within a predetermined range of movement to generate pressure in the hollow member and a liquid inlet in the hollow member connected to said cap, wherein:

said liquid inlet is disposed outside of the predetermined range of movement of said piston and a negative pressure is generated in the hollow member between said piston and said liquid inlet during movement of said piston for sucking air and/or liquid in said cap;

said piston includes biasing means for biasing a sealing member into sealing engagement with said liquid inlet; and said liquid inlet is sealed by the sealing member against negative pressure in the hollow member during a first portion of the predetermined range of movement of said piston and said liquid inlet is open during a second portion of the predetermined range of movement of said piston.

22. An ink jet recording apparatus according to claim 21, wherein said ink jet head includes electrothermal converting elements.

* * * * *

UNITED STATES PATENT AND TRADEMARK OFFICE
CERTIFICATE OF CORRECTION

PATENT NO. : 4,876,558

DATED : October 24, 1989

INVENTOR(S) : TOSHIHARU MAMIYA

It is certified that error appears in the above-identified patent and that said Letters Patent is hereby corrected as shown below:

COLUMN 1

Line 50, "kept" should read --maintained--.

COLUMN 2

Line 10, "biassed" should read --biased--.
Line 12, "keeps" should read --maintains--.
Line 14, "inflow hole -a" should read --inflow hole 1-a--.

COLUMN 3

Line 52, "the device" should read --the pump device--.
Line 54, "the invention." should read --the present invention.--.
Line 56, "the device" should read --the pump device--.

COLUMN 5

Line 30, "gear 19" should read --gear 219--.

COLUMN 6

Line 25, "holes 150-b -" should read --holes 150-b--.
Line 67, "gear 25" should read --gear 215--.

UNITED STATES PATENT AND TRADEMARK OFFICE

CERTIFICATE OF CORRECTION

PATENT NO. : 4,876,558

DATED : October 24, 1989

INVENTOR(S) : TOSHIHARU MAMIYA

It is certified that error appears in the above-identified patent and that said Letters Patent is hereby corrected as shown below:

COLUMN 8

Line 6, "(locked'" should read --(locked--.
Line 32, "154 ,are" should read --154 are-- and "account" should read --account,--.
Line 33, "need" should read --needs--.
Line 38, "the point" should read --the upper point--.
Line 43, "the," should read --the--.

COLUMN 9

Line 38, "short time" should read --a short time--.
Line 56, "preferable" should read --preferably--.

COLUMN 10

Line 23, "related with" should read --related to--.
Line 28, "respect&" should read --respect--.

COLUMN 12

Line 18, "wherein;" should read --wherein:--.
Line 48, "cup," should read --cap,--.
Line 55, "sling member" should read --sealing member--.

UNITED STATES PATENT AND TRADEMARK OFFICE

CERTIFICATE OF CORRECTION

PATENT NO. : 4,876,558

DATED : October 24, 1989

INVENTOR(S) : TOSHIHARU MAMIYA

It is certified that error appears in the above-identified patent and that said Letters Patent is hereby corrected as shown below:

COLUMN 13

Line 9, "liquid provided" should read --liquid inlet provided--.
Line 23, "smaller," should read --smaller--.
Line 43, "including" should read --includes--.

COLUMN 14

Line 12, "sealed member" should read --sealing member--.

Signed and Sealed this

Twenty-third Day of July, 1991

Attest:

HARRY F. MANBECK, JR.

Attesting Officer

Commissioner of Patents and Trademarks